Jan. 24, 1967 M. F. PETERS 3,300,053
FLUID SEPARATING DEVICE
Filed April 8, 1964 4 Sheets-Sheet 1
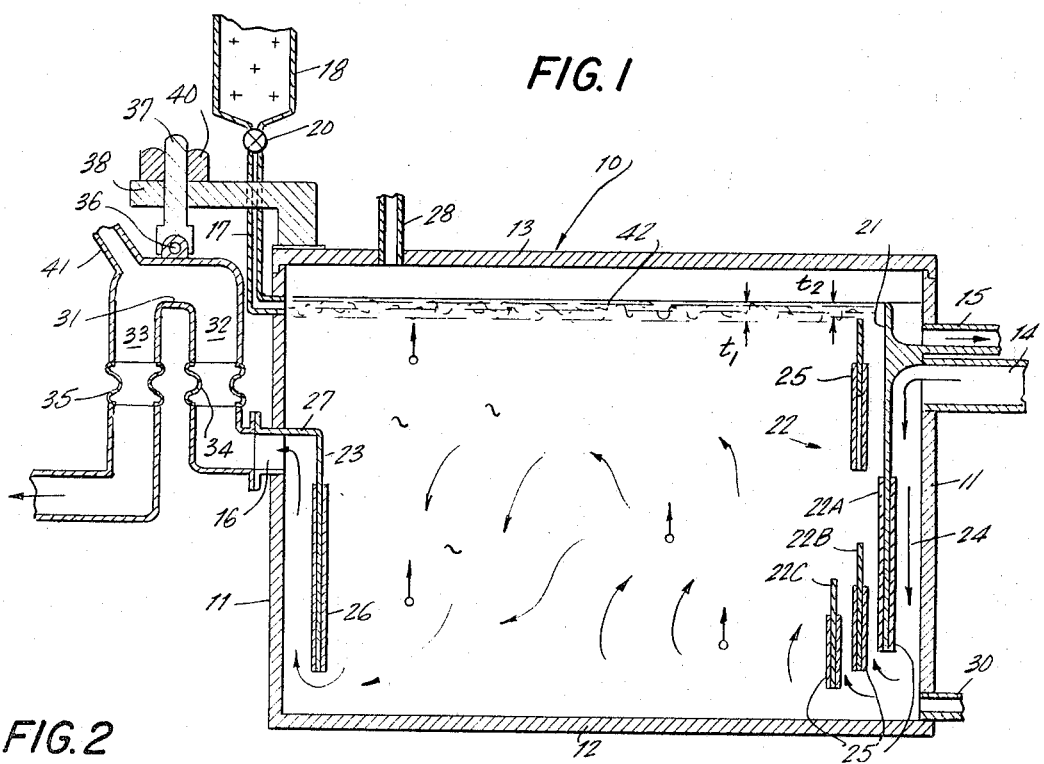
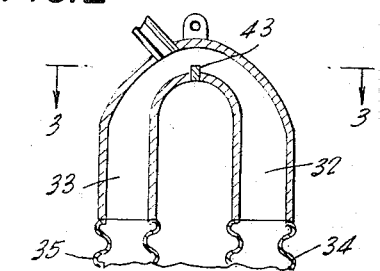
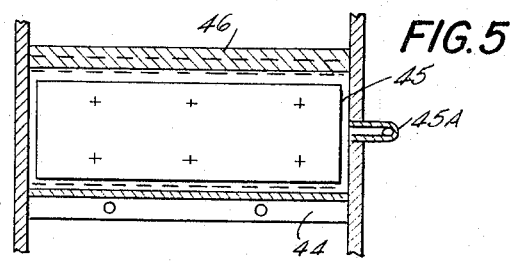
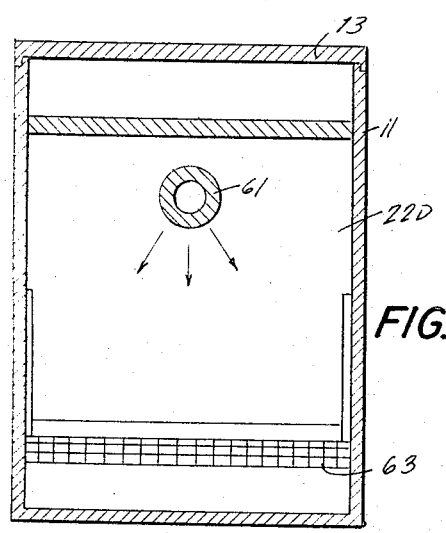
FIG.7  FIG.3  FIG.6
INVENTOR.
MELVILLE F. PETERS
BY Albert F. Kronman
ATTORNEY

INVENTOR.
MELVILLE F. PETERS
BY
ATTORNEY

Jan. 24, 1967   M. F. PETERS   3,300,053
FLUID SEPARATING DEVICE
Filed April 8, 1964   4 Sheets-Sheet 3

INVENTOR.
MELVILLE F. PETERS
BY Albert F. Kronman
ATTORNEY

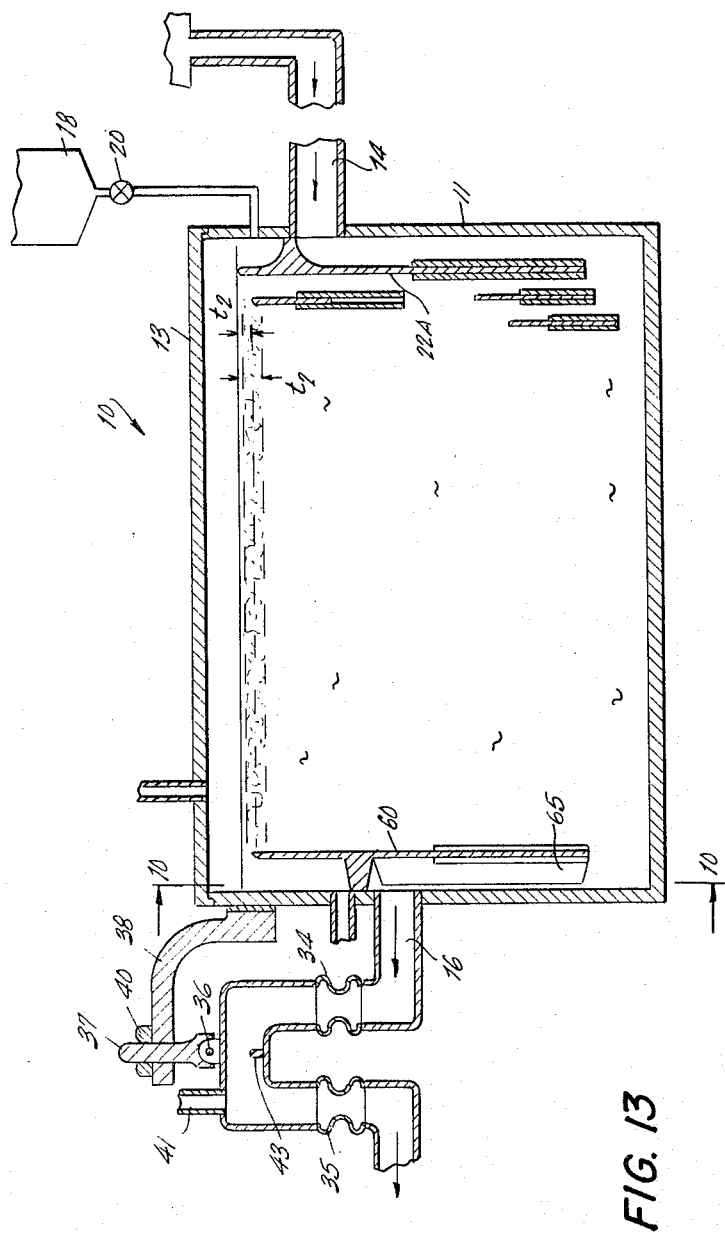

United States Patent Office 3,300,053
Patented Jan. 24, 1967

3,300,053
FLUID SEPARATING DEVICE
Melville F. Peters, 29 Northridge Road,
Livingston, N.J. 07039
Filed Apr. 8, 1964, Ser. No. 358,212
6 Claims. (Cl. 210—519)

This invention relates to the separation of two fluids having different specific gravities. It has particular reference to a tank wherein a fluid mixture is allowed to separate into its components and then the components are removed to separate containers by a self-regulating system of overflow operations.

The invention will be described with reference to the separation of grease (including soap products) from waste water but it is understood that the device can be used in any other similar application using like fluids.

Many types of separators and grease traps have been used in waste systems to recover or extract grease. Most of these separators are containers having an inlet pipe at one end and an outlet pipe at the other. The tank is first filled and then allowed to stand until the grease rises and forms on the surface. Then, some of the uncontaminated water is forced out of the separator through the outlet pipe by a like quantity of contaminated water entering through the inlet pipe. After each transfer the fluid is allowed to stand until the separation has taken place. After a number of such cyclic operations, the grease is skimmed from the top of the water manually.

The present invention is a continuous process and includes a tank having baffles and an adjustable outlet conduit. Waste water directed by the baffles enters the tank without causing turbulence or high velocity fluid flow within the tank. The grease is drawn off over a barrier whenever waste water enters the tank and the device is self-adjusting so that no entering water can be forced into the grease container.

One of the objects of this invention is to provide an improved fluid separator which avoids one or more of the disadvantages and limitations of prior art separators.

Another object of the invention is to separate and dispose of grease and other insoluble matter from water containing soap and other cleaning compounds.

Another object of the invention is to separate two fluids, one from another, based on their respective specific gravities.

A further object of the invention is to provide a means for sending a uniform stream of water across the lower portion of the tank during the period the incoming contaminated water is expelling the decontaminated water.

The invention comprises a tank having an inlet conduit for conveying contaminated water to the tank, an adjustable outlet conduit for conveying decontaminated water from the tank and an outlet conduit conveying the separated grease from the tank. The components are arranged so that the device is self-regulating for long periods of operation.

A feature of the invention resides in a plurality of baffles placed within the tank to reduce turbulence and high velocity flow so that the natural levels of the liquids are not disturbed and that grease which has been separated from the water is not again mixed with it.

Another feature of the invention is a static structure which elevates the height of the grease above the height of the decontaminated water thereby permitting accurate separation.

Another feature of the invention is an overflow conduit for the decontaminated water with an adjustable height barrier which can be used to control the height of the grease layer.

The invention consists of the construction, combination, and arrangement of parts, as herein illustrated, described, and claimed.

In the accompanying drawings, forming a part hereof, there are illustrated several forms of embodiment of the invention, in which drawings similar reference characters designate the corresponding parts, and in which:

FIGURE 1 is a cross sectional view of one complete embodiment of the present invention.

FIGURE 2 is a cross sectional view of an alternate form of outlet conduit for decontaminated water according to the present invention.

FIGURE 3 is a cross sectional view of the outlet conduit shown in FIGURE 2 and is taken along line 3—3 of that figure.

FIGURE 5 is a vertical section of the adjustable barrier shown in FIGURE 4. The section is taken along line 5—5 of FIGURE 4.

FIGURE 6 is a cross sectional view of the adjustable lip shown in FIGURES 4 and 5 supported in a bracket adjacent to an inlet or outlet conduit.

FIGURE 7 is a cross sectional view of a portion of the tank shown in FIGURE 4 and is taken along line 7—7 of that figure.

FIGURE 13 is a cross-sectional view of a complete separator similar to FIGURES 1 and 4 having the barrier for the grease layer adjoining the outlet pipe.

Figure 4:
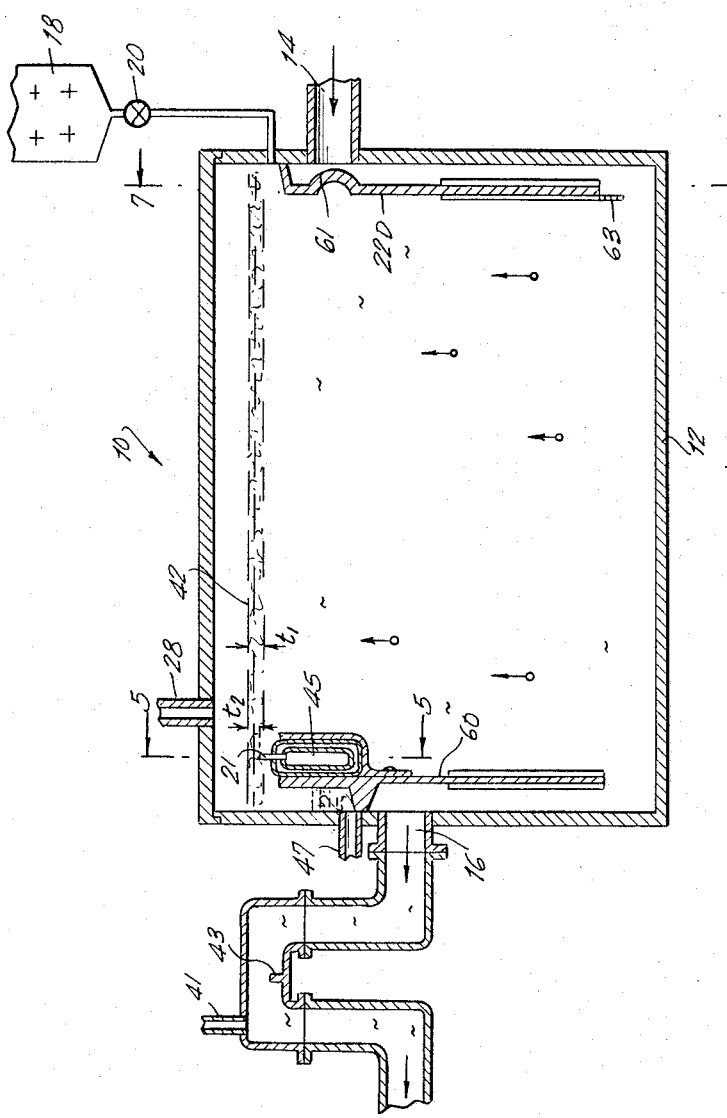
FIGURE 4 is a cross sectional view of a fluid separator similar to FIGURE 1 but having an adjustable barrier on the inside of the tank to regulate the grease flow, a further embodiment of the present invention.

Referring now to FIGURES 1, 2 and 3, the fluid separator includes a tank portion 10 having side walls 11, a bottom 12, and a top 13 which preferably includes a transparent window (not shown) for visual adjustment. An inlet conduit 14 is secured to one of the side walls 11 in the tank 10. The contaminated water flows slowly through this pipe into the tank. An outlet conduit 15 for the grease and other lighter liquids is mounted above the inlet conduit 14 and conveys the grease to a separate chamber (not shown). At the opposite end of the tank 10 an outlet conduit 16 is connected to the side wall 11 and is arranged for conveying the decontaminated water from the tank to a liquid leveling unit, a container, or to a sewer (not shown). A fourth conduit 17 may be connected to one of the side walls at the level where the grease components form. This conduit is connected to a container 18 from which chemicals are dispensed for increasing the surface tension of the interface between the surface of the water and the floating grease. A variety of chemicals may be used for this purpose and only a small volume is injected into the tank, under control of a valve 20. A preferred chemical for this purpose is a mixture of Hexadecanal (cetyl alcohol) and stearic acid. A small portion of the mixture having a relatively high surface tension injected into the tank in the neighborhood of conduit 17, will spread out and force the grease to the overflow lip 21. For many installations this additional injection means may be omitted. The contaminated water fills the tank to a level which is controlled by the liquid leveling assembly attached to outlet 16.

It will be understood that any disturbance of the fluids within the tank will interfere with the separation of the liquids. In order to decrease the turbulence and high velocity flow within the tank, a number of baffles 22 are used on the inlet side and at least one baffle 23 is provided for the outlet side. The contaminated water flows through conduit 14 and down along the inside surface of wall 11 in the general direction shown by arrow 24. The fluid mixture then moves along the bottom into the main portion of the tank and up through the spaces between baffles 22A, 22B, 22C, these baffles extending for the entire distance across the tank and fitting into channels 25. At the outlet portion of the tank, baffle 23 contains an upper turned-over portion 27 which will not permit water to enter outlet pipe 16 from the upper portions of the tank. The baffle is held in position by channel 26.

It is understood that the level of the mixture within tank 10 will change when different quantities of air are trapped between the layer of lighter material 42 and the top or cover plate 13. For this reason a breather pipe 28 is secured to the top portion 13 and is open to the atmosphere. Also there may be times when sediment must be cleaned from the tank and the entire interior portion of the tank cleaned and washed. An outlet pipe, 30 level with the base portion 12 is therefore provided but is used only when the tank is cleaned.

The principle of operation of this separator tank depends upon the diffefference in specific gravity between decontaminated water and grease. If water alone were in the tank the level in the tank at barrier 21 would be the same, or as a matter of safety only slightly below the level of the water flowing out of the tank across exit barrier portion 31. However, the grease which separates from the water forms a film on the top surface within the tank 10 and this film is considerably lighter than the water underneath. The level within the tank is consequently somewhat higher than the level of the decontaminated water which flows over the exit barrier 31. This level difference increases as the thickness of the grease layer increases. As a practical working value, a grease thickness of 4 cm. is enough to allow the surface of grease 42 to rise 1 cm. above the lip of barrier 21. This level assumes that the specific gravity of the grease is 0.8 and the specific gravity of the decontaminated water is 1.05 due to dissolved salts and other soluble contaminants. With this difference to work on, the contaminated water may be entered through conduit 14, the decontaminated water can be ejected over exit barrier 31 in the outlet assembly, and the grease will flow over barrier 21 into outlet conduit 15.

It will be understood that under different conditions of temperature, fluid flow, and grease content, the height of the barrier 21 should be varied in its position above the exit barrier portion 31. To this end, the height difference is made adjustable by several structural means, one of which is shown in FIGURE 1.

In FIGURE 1, one portion of the excess liquid flows through conduit 32, then over exit barrier 31, and then out through conduit 33. Both conduits 32 and 33 contain bellows portions 34 and 35, which permit the vertical adjustment of the top portion which includes barrier 31. The top portion may be raised or lowered by any convenient means such as that shown in FIGURE 1. In this control means an eyelet 36 is secured to the top portion of the U shaped outlet conduit and a threaded bolt 37 extends upwardly through a horizontal portion of a bracket 38 secured to a portion of the tank 10. The bolt 37 is controlled by a nut 40 which may be turned to adjust the height of barrier 31 within the outlet conduit. A breather tube 41 is connected to the upper portion of the U shaped outlet conduit so that this portion of the other conduit is opened to the atmosphere and variations of air pressure above the barrier will not influence the height of liquid within the conduit.

The operation of this type of separator is as follows: the tank is first filled with a mixture of the two fluids which may be waste water and grease. This mixture flows into the tank through inlet conduit 14 and then downwardly behind baffles 22 to the lower portion of the tank. As more fluid enters, the upper level of the mixture gradually rises until the top is level with the top of barrier 31. If the tank has been filled slowly, and the outlet barrier 31 correctly adjusted, the mixture in the tank will be level with barrier 21 when the mixture in conduit 32 is level with outlet barrier 31.

If more contaminated water enters the tank after the mixture has stood long enough to allow the lighter liquid 42 to collect on the top of the water, a portion of the lighter liquid will rise above barrier 21 and flow into outlet conduit 15 during the flow of the uncontaminated liquid over barrier 31. The lighter fluid is collected in a suitable container (not shown) at the end of conduit 15 while the heavier fluid passes through conduit 33 to a container or to a waste sewer.

It is assumed that the flow of the mixture of fluids into the tank is slow enough so as to not stir up the liquid in the upper portion of tank 10. This is accomplished by arranging the inlet baffle assembly 22 and outlet baffle 23 in a tank of sufficient size to distribute the flow uniformly across the lower portion of the tank. With proper regulation of liquids into the tank, the lighter liquid such as grease forms a continuous flow over barrier 21 while the heavier liquid such as water forms a continuous stream over exit barrier 31. This system is self-regulating and maintains the thickness of grease 42 within some range between $t_1$ and $t_2$.

Let it be assumed that 4 cm. of grease has been collected in the upper layer and that the specific gravity of this substance is 0.8. Let it also be assumed that the decontaminated water has a specific gravity of 1.05 because of the salts and other soluble waste materials. A simple computation shows that the difference in levels between barrier 21 and barrier 31 should be 1 cm. for equilibrium. Under these conditions, flow of the mixture through conduit 14 produces simultaneous flow of grease over barrier 21 and water over exit barrier 31. It is obvious that this operation may continue for an indefinite time without manual adjustment and with complete liquid separation as long as the flow of liquid through tank 10 is confined to the lower section.

The cross-sectional view of the outlet conduit shown in FIGURE 2 is similar to that shown in FIGURE 1 except that the extended barrier 43 having an upper horizontal edge is more efficient that the flat exit barrier 31 shown in FIGURE 1. The adjustment and operation are similar.

The adjustable barrier need not be placed in the outlet conduit. All that is necessary for the successful operation is the relative adjustment of barriers 21 and 31. In FIG- URE 4, barrier 43 is stationary while the grease barrier 21 is adjustable. This type of adjustment is shown in greater detail in FIGURES 5 and 6 where a bracket 44 supports an elastic container 45, the internal portion of which is connected to a variable source of pressure outside the tank by a tube 45A. At the top of this container a barrier 46, similar to barrier 43, is mounted and the variation of pressure within the elastic container varies the vertical height of the barrier 46. This type of adjustable barrier may be used to control the flow of the lighter fluid through an outlet conduit 47 as shown in FIGURE 4.

Figures 11, 12:
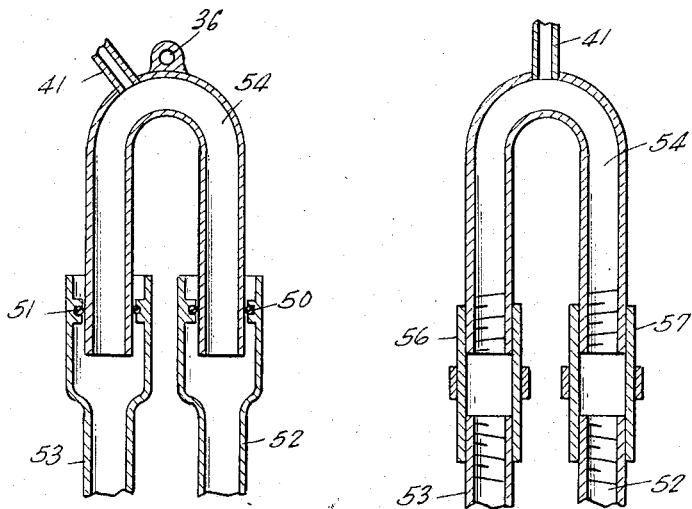
FIGURE 11 is a cross-sectional view of an alternate form of outlet conduit equipped with slip joints and O rings.
FIGURE 12 is a cross-sectional view of another alternate arrangement of the outlet assembly having pipe couplings including both right and left hand threads whereby the barrier level may be adjusted in a vertical direction.

FIGURES 1, 2 and 13, show a bellows 34 and 35 for the adjustment of the outlet barrier. In FIGURE 11, a simplified adjustment is shown where two O rings 50 and 51 are secured to the stator portions 52 and 53 of the outlet conduit. An inverted U-type tube 54 with straight sides may be pushed up and down by the usual control mechanism secured to eyelet 36. A second form of adjustment is shown in FIGURE 12 where the two stator portions 52 and 53 are equipped with left hand threads. The U-type tube 54 has its lower portions threaded with right hand threads and two adjustable nuts 56 and 57 are meshed with these threads and rotated in unison to provide the necessary vertical adjustment of conduit 54.

The grease separator shown in FIGURE 4 is similar to the one shown in FIGURE 1 and includes the usual tank 10 with an inlet conduit 14 and an inlet baffle 2D. The outlet conduit 16 is placed behind baffle 60 which differs from baffle 23 in that it supports an adjustable barrier 45 similar to that described above and shown in FIGURE 6. Because the barrier 21 of this arrangement is within the tank and adjacent to the upper fluid level 42, the output conduit is not adjustable and the barrier 43 within the conduit remains fixed at all times. The discharge conduit 47 is positioned just above outlet conduit 16 but the operation of this alternate arrangement is the same as the one shown in FIGURE 1. However, the separators shown in FIGURES 1 and 4, can be operated with the barrier 21 on either the outlet or inlet end. Baffle 22D is similar to baffle 22A except that it is provided with a hemispherical extension 61 which is mounted in axial alignment with the inlet conduit 14. This extension spreads the fluid mixture flowing into the tank and moves it into a fan-shaped flow pattern which lowers velocity of the mixture as it enters the tank and prevents turbulence.

Figures 8, 9:
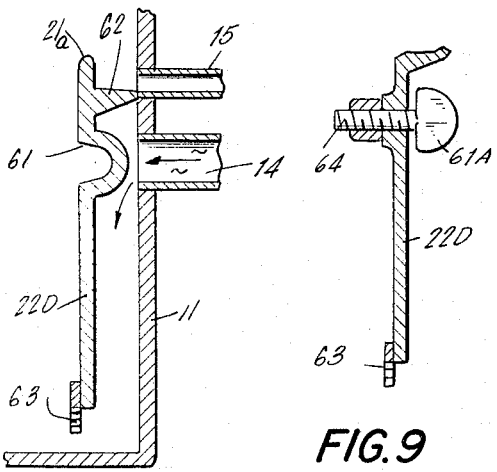
FIGURE 8 is a fragmentary cross section of a tank showing an alternate arrangement of the inlet baffle.
FIGURE 9 is a fragmentary cross section of a tank showing still another arrangement of an inlet baffle but having an adjustable entrance plug for controlling the flow of contaminated waste water into the tank.

An alternate arrangement of the inlet barrier 22D is shown in FIGURES 8 and 9. In FIGURE 8 the baffle includes the extension 61 and also provides a barrier 21a for the lighter fluid which in this arrangement passes out of the tank just above the baffle and is partitioned from the lower fluid mixture by a horizontal wall 62. The baffle shown in FIGURE 9 is similar to that shown in FIGURE 8 except that the extension which fans out the fluid mixture is adjustable and includes a hemispherical extension 61A mounted on the end of a screw 64 which is threaded into a portion of the baffle 22D. It is obvious that this extension may be employed to limit the flow of the inlet mixture. A screen 63 is disposed across the bottom of the baffle 22D to further reduce turbulence.

Referring now to an alternate arrangement of baffles and barriers shown in FIGURE 13, the inlet conduit 14 is the same as that shown in FIGURE 1 as is also the inlet baffle 22A and the other baffles working in conjunction with it. The outlet baffle is similar to FIGURE 4 but does not contain the internal adjustable means 45. The means of adjusting the relative height of the two barriers is the same as that shown in FIGURE 1 where a pair of bellows 34–35 are connected in series with the outlet conduit 16 and the upper portion of the U shaped conduit is controlled in its vertical position by a screw 37 secured to eyelet 36 and adjusted by means of a nut 40 supported by a bracket 38. This adjustable conduit includes a horizontal barrier 43 similar to that shown in FIGURE 4.

Figure 10:
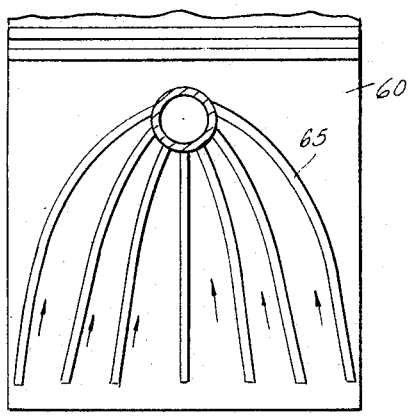
FIGURE 10 is an elevational view of an outlet baffle plate having ridges and channels for directing the fluid flow without creating turbulence.

It is obvious that such a separator device works best when there is no turbulence within the tank and the fluid velocity of both the heavier and lighter fluids is kept at a minimum. To this end, baffle 60 is formed with a plurality of ridges 65, shown in greater detail in the elevational view in FIGURE 10. These ridges are streamlined and direct the flow of the heavier fluid from the lower edge of the baffle into lines of flow which contain no sharp corners, spread the fluid over a wider area, and thereby reduce and equalize the outlet velocity. A similar baffle could be substituted for the inlet baffles 22A, 22B, and 22C, and 25 in FIGURE 1 or inlet baffle 22D in FIGURE 4.

From the above description it will be obvious that means have been provided for an efficient fluid separator which requires pratcically no power for its operation and which is self-regulating over long periods of time.

Having thus fully described the invention, what is claimed as new and desired to be secured by Letters Patent of the United States, is:

1. A fluid separator for separating a lighter fluid from a heaiver fluid comprising, a tank to receive said fluids for a time interval to permit the lighter fluid to rise above the heavier fluid to form a top layer, an inlet conduit connected to the tank for conveying fluid mixtures into the tank, baffle means adjacent to the inlet conduit to direct the mixture of fluids toward the bottom of the tank, a first outlet conduit connected to the tank for conveying the heavier fluid from the tank, said outlet conduit being connected to the tank at a point below the predetermined operating level of the heavier fluid, baffle means adjacent to the first outlet conduit to admit fluid to the outlet conduit only from the bottom portion of the tank, a second outlet conduit adjacent to the top of the tank for conveying the lighter fluid from the tank, a first horizontal barrier in said first outlet conduit which passes the heavier fluid only when the height of the heavier fluid within the tank is above the first barrier level, a second adjustable horizontal barrier in the tank and adjacent to the second outlet conduit which passes the lighter fluid into the second outlet conduit only when the lighter fluid level is above the second barrier level, said first horizontal barrier being disposed at a level below the second horizontal barrier, said barriers being spaced from one another a vertical distance within which the bottom surface of the lighter fluid rests on the top surface of the heavier fluid when the levels of the fluids are at their predetermined operating heights, and means for adjusting the height of said second adjustable horizontal barrier in a vertical direction comprising an elastic container connected by a tube to a source of variable pressure external of the tank, said elastic container being adapted to raise and lower the second barrier in response to the pressure within the container.

2. A fluid separator as claimed in claim 1 wherein the height of the horizontal barrier in the first outlet conduit is adjustable in a vertical direction, the adjustment being made by means of flexible bellows which are part of the first outlet conduit.

3. A fluid separator as claimed in claim 1 wherein the first outlet conduit is formed in the shape of an inverted U, the inner bottom wall portion of the first outlet conduit acting as a barrier for limiting the flow of the heavier fluid out of the tank.

4. A fluid separator as claimed in claim 3 wherein the first outlet conduit includes at least one sliding conduit joint having an annular sealing means.

5. A fluid separator as claimed in claim 3 wherein the first outlet conduit includes at least one variable pipe joint having an auxiliary cooperating nut with a right-hand thread engaging one portion of the first outlet conduit and a left-hand thread engaging another portion of the first outlet conduit.

6. A fluid separator as claimed in claim 3 wherein the second mentioned baffle is formed with ridges and channels which direct the flow of the heavier fluid from the lower edge of the baffle to the end of the first output conduit.

References Cited by the Examiner
UNITED STATES PATENTS

| | | | |
|---|---|---|---|
| 801,330 | 10/1905 | Moore | 210—540 |
| 1,223,004 | 4/1917 | Starr | 210—532 |
| 1,475,289 | 11/1923 | Diescher | 285—299 X |
| 1,530,077 | 3/1925 | Haynes | 210—533 |
| 2,076,380 | 4/1937 | Marsh | 210—540 X |
| 2,284,737 | 6/1942 | Hirshstein | 210—540 X |
| 2,338,971 | 1/1944 | Ross | 210—532 X |
| 2,479,386 | 8/1949 | Matheis | 210—540 |
| 2,730,190 | 1/1956 | Brown et al. | 210—511 X |
| 2,782,929 | 2/1957 | Colket | 210—540 X |
| 3,224,593 | 12/1965 | Nebolsine | 210—519 |

FOREIGN PATENTS

| | | |
|---|---|---|
| 540,361 | 4/1957 | Canada. |
| 946,009 | 12/1948 | France. |

REUBEN FRIEDMAN, *Primary Examiner.*

J. DE CESARE, *Assistant Examiner.*